(12) United States Patent
Sullivan

(10) Patent No.: US 11,300,130 B2
(45) Date of Patent: Apr. 12, 2022

(54) ELECTRIC MACHINE

(71) Applicant: Dyson Technology Limited, Wiltshire (GB)

(72) Inventor: Christopher Keith Sullivan, Yate (GB)

(73) Assignee: Dyson Technology Limited, Wiltshire (GB)

( * ) Notice: Subject to any disclaimer, the term of this patent is extended or adjusted under 35 U.S.C. 154(b) by 218 days.

(21) Appl. No.: 16/011,961

(22) Filed: Jun. 19, 2018

(65) Prior Publication Data
US 2018/0363669 A1 Dec. 20, 2018

(30) Foreign Application Priority Data

Jun. 20, 2017 (GB) ...................................... 1709839

(51) Int. Cl.
*F04D 29/056* (2006.01)
*F04D 25/06* (2006.01)
(Continued)

(52) U.S. Cl.
CPC ........... *F04D 25/06* (2013.01); *F04D 29/056* (2013.01); *H02K 7/083* (2013.01); *F04D 29/284* (2013.01);
(Continued)

(58) Field of Classification Search
CPC ............. F04D 29/5806; F04D 29/5813; F04D 19/00–048; F04D 25/046; F04D 29/046–059; H02K 9/00–28; H02K 1/18; H02K 1/148; H02K 3/521; H02K 3/52; H02K 3/46–487; F16C 35/077
See application file for complete search history.

(56) References Cited

U.S. PATENT DOCUMENTS 2,114,670 A * 4/1938 Searles ................. F16C 27/066
384/536
3,701,911 A * 10/1972 Hallerback .............. H02K 5/15
310/60 R
(Continued)

FOREIGN PATENT DOCUMENTS

CN 1390377 1/2003
CN 1853047 A 10/2006
(Continued)

OTHER PUBLICATIONS

Machinebuilding.net (URL: http://www.machinebuilding.net/ta/t0418.htm) published Feb. 12, 2014 (Year: 2014).*
(Continued)

*Primary Examiner* — Devon C Kramer
*Assistant Examiner* — Thomas Fink
(74) *Attorney, Agent, or Firm* — Faegre Drinker Biddle & Reath LLP

(57) ABSTRACT

An electric machine comprising: a stator assembly; a rotor assembly; and a support body. The rotor assembly comprises a shaft to which is mounted a first bearing and a second bearing either side of a permanent magnet, and the support body comprises first and second bearing seats to which the bearings of the rotor assembly are mounted, wherein the first bearing is mounted to the first bearing seat by adhesive, and the second bearing is soft-mounted to the second bearing seat by an o-ring.

11 Claims, 3 Drawing Sheets

(51) Int. Cl.
  *H02K 7/08* (2006.01)
  *F16C 27/06* (2006.01)
  *H02K 7/16* (2006.01)
  *F04D 29/28* (2006.01)

(52) U.S. Cl.
  CPC ........ *F05D 2240/50* (2013.01); *F16C 27/066* (2013.01); *H02K 7/16* (2013.01)

(56) References Cited

U.S. PATENT DOCUMENTS

| | | | | |
|---|---|---|---|---|
| 3,807,040 | A * | 4/1974 | Otto | H02K 1/185 |
| | | | | 29/596 |
| 4,801,831 | A * | 1/1989 | Lewis | H02K 1/185 |
| | | | | 310/89 |
| 4,810,108 | A | 3/1989 | Yajima | |
| 5,238,336 | A * | 8/1993 | Sanders | B23B 47/288 |
| | | | | 408/112 |
| 5,610,461 | A * | 3/1997 | Dohogne | H02K 5/15 |
| | | | | 310/89 |
| 5,904,471 | A * | 5/1999 | Woollenweber | F02B 37/16 |
| | | | | 417/307 |
| 5,975,764 | A * | 11/1999 | Okada | F16C 19/52 |
| | | | | 384/476 |
| 6,700,255 | B1 | 3/2004 | Stenta | |
| 9,360,082 | B2 * | 6/2016 | Hilton | F16F 15/3156 |
| 10,428,871 | B2 * | 10/2019 | Yang | F16C 19/522 |
| 2003/0190583 | A1 * | 10/2003 | Kuhn | F16C 27/066 |
| | | | | 433/131 |
| 2007/0116396 | A1 * | 5/2007 | Young | F16C 27/066 |
| | | | | 384/537 |
| 2007/0147717 | A1 | 6/2007 | Kusano et al. | |
| 2007/0228847 | A1 * | 10/2007 | Kim | H02K 1/32 |
| | | | | 310/61 |
| 2007/0230839 | A1 | 10/2007 | Childe | |
| 2008/0304986 | A1 * | 12/2008 | Kenyon | H02K 5/24 |
| | | | | 417/423.12 |
| 2009/0152967 | A1 | 6/2009 | Sahara et al. | |
| 2009/0160277 | A1 * | 6/2009 | Obara | F16C 33/08 |
| | | | | 310/90 |
| 2010/0196174 | A1 * | 8/2010 | Lee | F04D 25/0606 |
| | | | | 417/410.1 |
| 2010/0215491 | A1 | 8/2010 | Mockridge et al. | |
| 2010/0328819 | A1 * | 12/2010 | Shinji | F16C 35/02 |
| | | | | 360/244 |
| 2011/0068661 | A1 * | 3/2011 | Clendenen | H02K 11/33 |
| | | | | 310/68 D |
| 2012/0128512 | A1 * | 5/2012 | Vande Sande | H02K 9/06 |
| | | | | 417/410.1 |
| 2012/0237373 | A1 * | 9/2012 | Li | F04D 25/0606 |
| | | | | 417/410.1 |
| 2013/0052051 | A1 * | 2/2013 | Clothier | F04D 29/5806 |
| | | | | 417/366 |
| 2013/0121858 | A1 | 5/2013 | Sekita | |
| 2013/0199372 | A1 | 8/2013 | Nock et al. | |
| 2014/0090645 | A1 | 4/2014 | Sears | |
| 2014/0328674 | A1 * | 11/2014 | Jacob | F04D 29/059 |
| | | | | 415/177 |
| 2016/0061254 | A1 * | 3/2016 | Varnoux | H02K 7/08 |
| | | | | 310/90 |
| 2016/0087505 | A1 | 3/2016 | Turner et al. | |
| 2016/0195130 | A1 * | 7/2016 | Moratz | F16C 35/077 |
| | | | | 384/582 |
| 2016/0204676 | A1 * | 7/2016 | Ziegler | H02K 9/02 |
| | | | | 392/379 |
| 2016/0238030 | A1 * | 8/2016 | Chou | F04D 25/082 |
| 2017/0110938 | A1 * | 4/2017 | Chou | H02K 9/14 |
| 2018/0076683 | A1 * | 3/2018 | Hwang | H02K 5/20 |
| 2018/0266440 | A1 * | 9/2018 | Shiozawa | F04D 25/06 |
| 2019/0165651 | A1 * | 5/2019 | Kishi | H02K 9/22 |
| 2020/0040903 | A1 * | 2/2020 | Iizuka | F04D 29/059 |
| 2020/0059133 | A1 * | 2/2020 | Okubo | H02K 7/14 |
| 2020/0112224 | A1 * | 4/2020 | Okubo | H02K 5/20 |

FOREIGN PATENT DOCUMENTS

| | | | |
|---|---|---|---|
| CN | 101138146 | | 3/2008 |
| CN | 101553667 | A | 10/2009 |
| CN | 202134992 | | 2/2012 |
| CN | 102414461 | | 4/2012 |
| CN | 102726820 | | 10/2012 |
| CN | 203770422 | U | 8/2014 |
| CN | 105449909 | | 3/2016 |
| DE | 102007047644 | | 4/2009 |
| DE | 102014204608 | | 9/2015 |
| EP | 1970580 | A1 | 9/2008 |
| FR | 2926247 | A | 7/2009 |
| JP | 10-178760 | | 6/1998 |
| JP | 2000-23414 | | 1/2000 |
| JP | 2000-230564 | | 8/2000 |
| JP | 2005-188527 | A | 7/2005 |
| JP | 2013-174240 | | 9/2013 |
| JP | 6725064 | B2 * | 7/2020 ........... F04D 29/056 |
| KR | 10-2009-0089336 | A | 8/2009 |
| KR | 10-2018-0028842 | * | 3/2018 ............... H02K 5/16 |
| WO | 2008/051534 | A2 | 5/2008 |
| WO | 2011/012456 | | 2/2011 |
| WO | 2017/077585 | | 5/2017 |

OTHER PUBLICATIONS

International Search Report and Written Opinion dated Jun. 26, 2018, directed to International Application No. PCT/GB2018/051134; 13 pages.
Notification of Reason for Rejection dated Apr. 22, 2019, directed to JP Application No. 2018-116269; 6 pages.
Office Action dated Mar. 19, 2019, directed to CN Application No. ZL2018208594660; 6 pages.
Search Report dated Nov. 13, 2020, directed to EP Application No. 18722182.5; 7 pages.
The First Office Action dated Nov. 29, 2019, directed to CN Application No. 201810563626.1; 14 pages.
The Second Office Action dated Jun. 22, 2020, directed to CN Application No. 201810563626.1; 12 pages.
Search Report dated Jan. 1, 2018, directed to GB Application No. 1709839.3; 1 page.
Notification of Reason for Refusal dated Jan. 26, 2021, directed to KR Application No. 10-2020-7000735; 10 pages.

* cited by examiner

ELECTRIC MACHINE

REFERENCE TO RELATED APPLICATIONS

This application claims the priority of United Kingdom Application No. 1709839.3, filed Jun. 20, 2017, the entire contents of which are incorporated herein by reference.

FIELD OF THE INVENTION

The present invention relates to an electric machine.

BACKGROUND OF THE INVENTION

There is a general desire to improve electric machines, such as brushless electric motors, in a number of ways. In particular, improvements may be desired in terms of size weight, manufacturing cost, efficiency, reliability and noise.

It is becoming more and more common for electric machines such as brushless electric motors to be used a very high speeds, for example at 100 krpm or more. When operating at such high speeds, the components of the motor are subjected to very large forces. In order for the motor to maintain performance and reliability over the lifetime of the motor, it must be capable of withstanding these large forces. Therefore, there is a need to find improvements that allow motors to withstand large forces experienced at high operating speeds.

SUMMARY OF THE INVENTION

This invention provides an electric machine comprising: a stator assembly; a rotor assembly; and a support body. The rotor assembly comprises a shaft to which is mounted a first bearing and a second bearing either side of a permanent magnet, and the support body comprises first and second bearing seats to which the bearings of the rotor assembly are mounted, wherein the first bearing is mounted to the first bearing seat by adhesive, and the second bearing is soft-mounted to the second bearing seat by an o-ring.

As a result, the rotor assembly, and the points of connection between the rotor assembly and the support body, can more effectively withstand and absorb both axial and radial forces that they are subjected to when the electric machine is in use. The bearing which is soft mounted is effective at absorbing radial forces, and the bearing which is fixed by adhesive is effective at withstanding any axial forces. As such, a beneficial synergistic effect arises from the use of two different mounting methods for the two bearings.

The shaft may be driving a load mounted to one end of the shaft, and the second bearing may be closer to the load than the first bearing. As a result, the bearing that is closest to the load is soft mounted to the support body. Radial forces are most likely to be generated by the load attached to the shaft, and so it is beneficial for the bearing closest to the load to be able to absorb any radial forces caused by the load spinning during use so that it does not have a negative impact on the strength of the adhesive bond at the other bearing. Any axial forces are transferred along the rotor assembly, and are withstood by the bearing which is spaced further away from the load.

The electric machine may be a compressor and the load may be an impeller. The impeller may be a mixed flow impeller.

An annular groove may be provided in at least one of the outer surface of the second bearing and the bearing seat, and the o-ring is positioned in said annular groove. As a result, the o-ring will remain in the desired position and will not shift position which could reduce the effectiveness of the soft mounting provided by the o-ring.

An annular groove may be provided in at least one of the outer surface of the first bearing, and the bearing seat, the annular groove providing a channel in which adhesive can be located. This channel can allow for a clean adhesive bond, and reduces the chance that adhesive will flow out from between the bearing and the bearing seat during assembly which would reduce the effectiveness of the adhesive bond. If adhesive was able to flow out, there is also the chance that it may enter into the bearing itself which would be extremely detrimental to the bearing and could stop it from functioning completely.

The support body may comprise an elongate central part, and the first and second bearing seats may be positioned axially at opposite ends of the elongate central part such that the permanent magnet is positioned within the elongate central part of the support body. The elongate central part may support the stator assembly. As a result, very tight control of the relative positioning of the magnet and the stator assembly can be achieved, which may result in a more efficient electric machine.

BRIEF DESCRIPTION OF THE DRAWINGS

In order that the present invention may be more readily understood, embodiments of the invention will now be described, by way of example, with reference to the following accompanying drawings, in which.

DETAILED DESCRIPTION OF THE INVENTION

Figure 1:
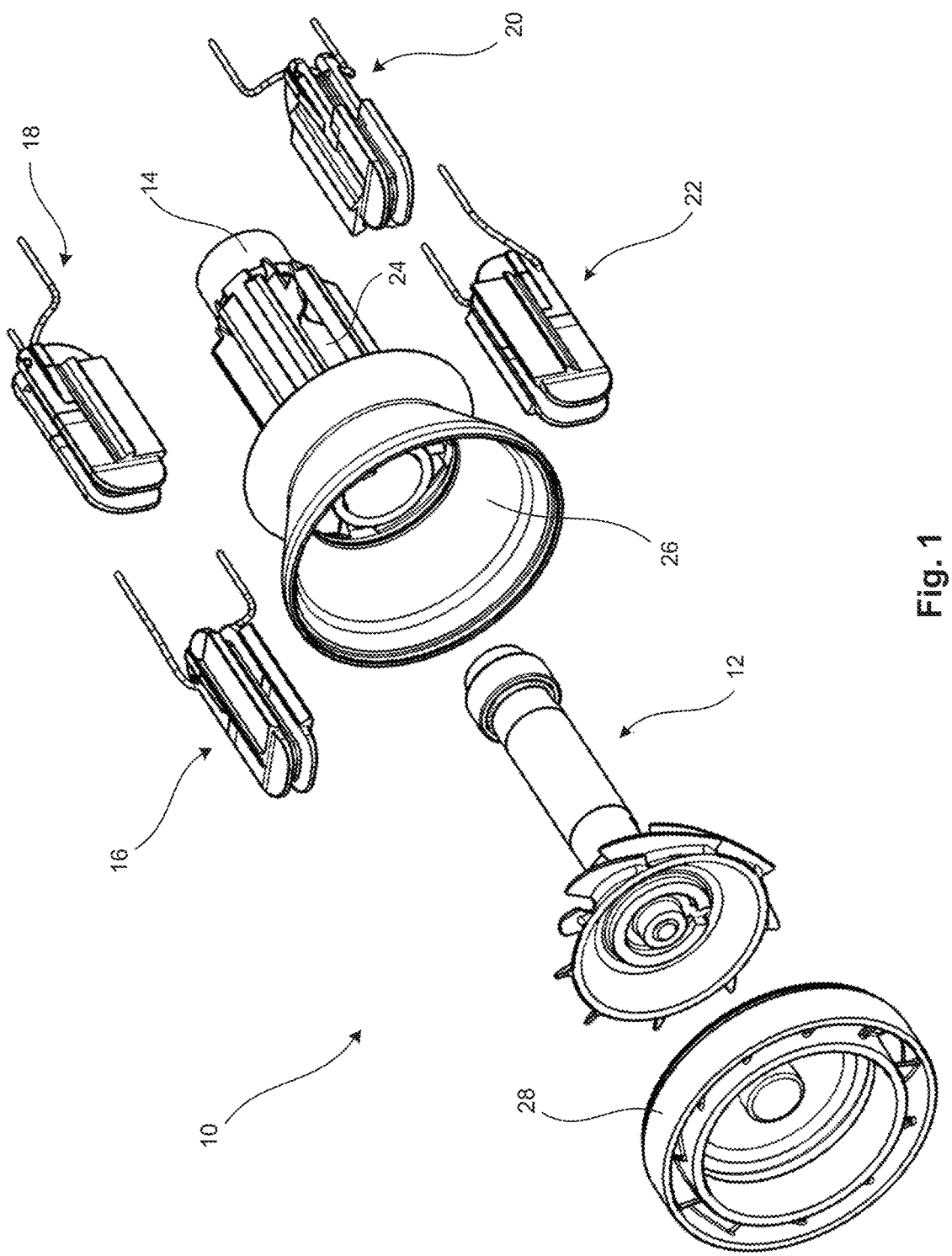
FIG. 1 shows an exploded perspective view of a compressor.
Figure 4:
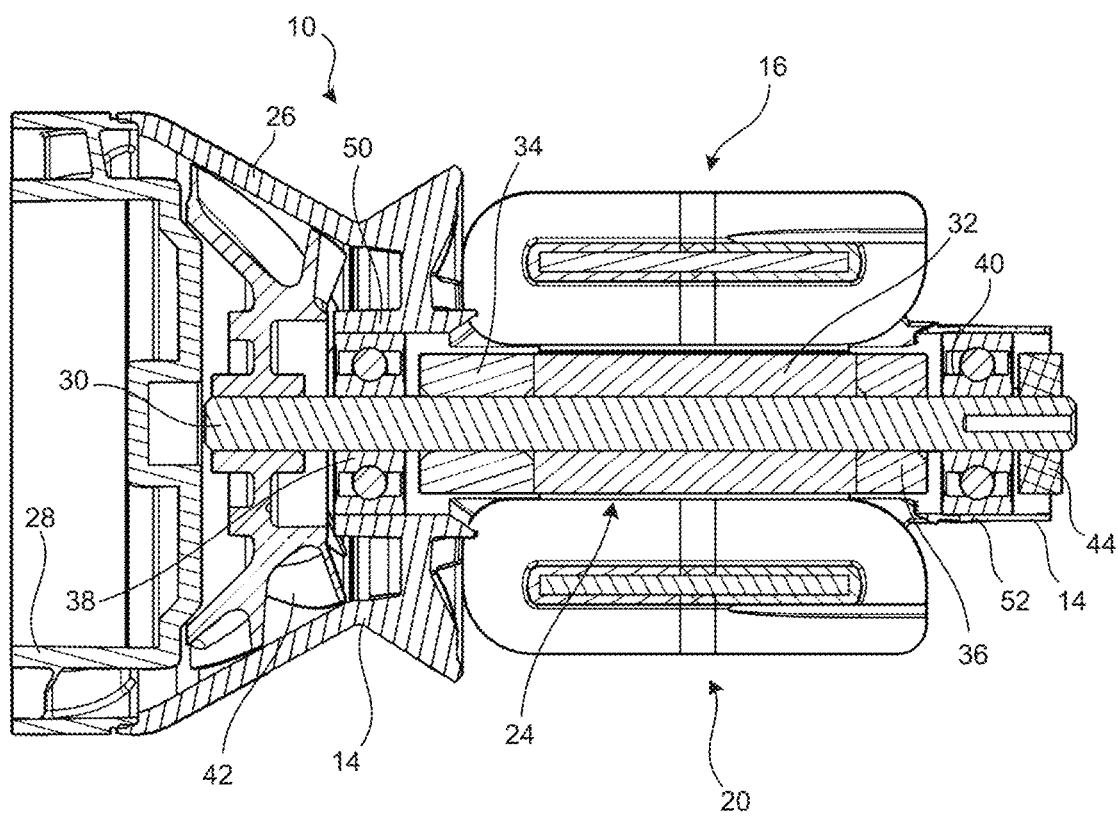
FIG. 4 shows a cross section of a compressor.

FIG. 1 shows an exploded perspective view of an electric machine 10 in the form of a compressor. Certain components, such as control electronics and an external housing, are not shown for clarity. The electric machine 10 includes a rotor assembly 12, a support body 14 and a stator assembly comprising four stator elements 16, 18, 20 and 22. When the electric machine 10 is assembled, the rotor assembly 12 is located within and mounted to the support body 14, and the stator elements are located in respective slots in the support body 14. For example, the stator element 20 is located within slot 24 in the support body. The support body 14 may be a one-piece construction, for example moulded as a single object, and includes an impeller shroud 26 that covers the impeller as shown in FIG. 4. The motor 10 also includes a diffuser 28.

Figure 2:
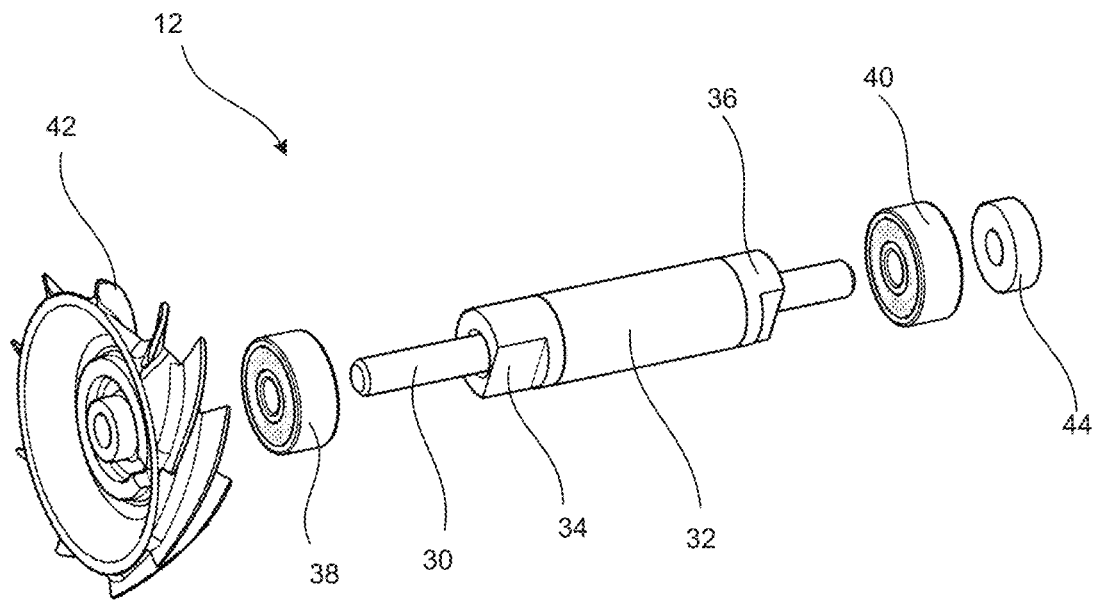
FIG. 2 shows an exploded perspective view of a rotor assembly.

FIG. 2 shows an exploded perspective view of the rotor assembly 12. The rotor assembly 12 comprises a shaft 30 on which is mounted a rotor core permanent magnet 32, a first balancing ring 34 and a second balancing ring 36. When the rotor assembly 12 is assembled, a pair of bearings 38, 40 are mounted on the shaft 30 on either side of the core 32 and balancing rings 34, 36. An impeller is 42 is mounted at one end of the shaft 30, and a sensor magnet 44 is mounted at the other end.

Figure 3:
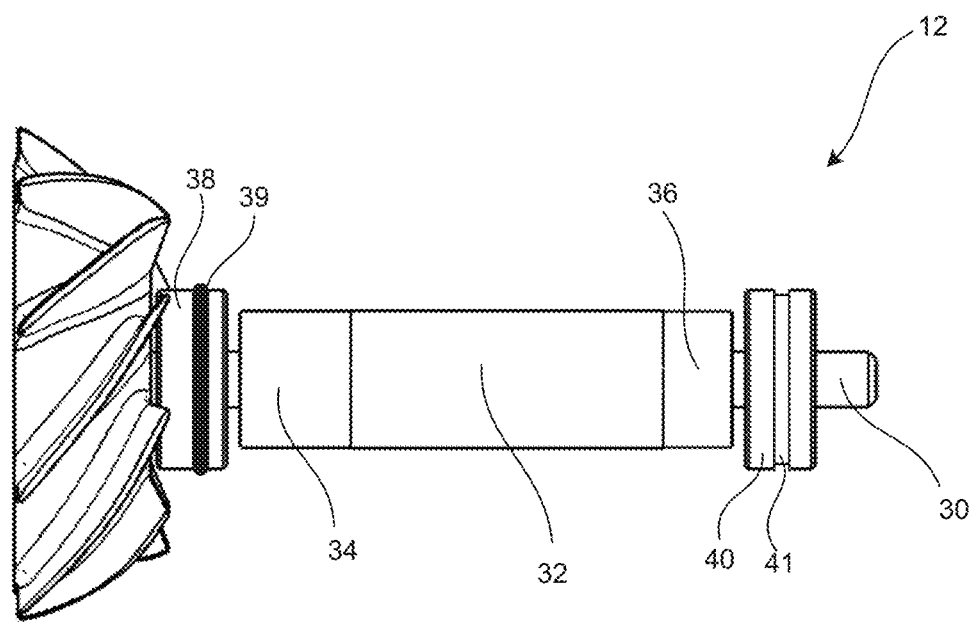
FIG. 3 shows an assembled rotor assembly.

FIG. 3 shows an assembled rotor assembly 12. Similar to FIG. 2, the rotor assembly 12 comprises a shaft 30 on which is mounted a rotor core permanent magnet 32, and balancing rings 34, 36 positioned either side of the magnet 32. At one end of the magnet 32, fixed to the shaft 30 is a first bearing 40 with is provided with an annular groove or channel 41 on the outer circumferential surface thereof. The groove 41 provides a channel in which adhesive can be located. When the rotor assembly 12 is assembled into place within the support body 14, the first bearing 40 sits inside a bearing seat in the support body, and is fixed therein using adhesive. The channel 41 allows for a stronger bond to be achieved between the first bearing 41 and the bearing seat, and reduces the chance that adhesive will flow out from between the bearing and the bearing seat during assembly which would reduce the effectiveness of the adhesive bond. Furthermore, if adhesive was able to flow out, there would be a chance that adhesive may contaminate the bearing itself which would be extremely detrimental to the bearing and could stop it from functioning completely.

Fixed to the shaft 30 at the opposite end of the magnet 32 is a second bearing 38. An o-ring 39 is placed around the second bearing 38. Although it can't be seen in FIG. 3, the second bearing is also is provided with an annular groove or channel (not shown) on the outer circumferential surface thereof. The o-ring 39 sits within this channel in order that the o-ring remains in a desired position on the bearing 38 and will not move around. When the rotor assembly 12 is assembled into place within the support body 14, the second bearing 38 sits inside a second bearing seat in the support body, and is soft mounted thereto by way of the o-ring 39.

FIG. 4 shows a cross-section of the assembled electric machine 10 through a plane that includes the axis of rotation of the rotor assembly 12. The stator elements 16, 20 are shown inserted into their respective slots in the support body 14, for example stator element 20 is inserted into slot 24. It can also be seen that the bearings 38, 40 of the rotor assembly 12 are positioned within the support body 14 and mounted to bearing seats 50 and 52 respectively. Although not shown in FIG. 4, bearing 38 is soft-mounted within bearing seat 50 by an o-ring, and bearing 40 is hard mounted to bearing seat 52 by adhesive.

The first bearing 40 is positioned further away from the impeller 42 than the second bearing 38. The first bearing 40 is fixed to the bearing seat 52 by adhesive, and is able to withstand axial forces along the rotor that are generated by the impeller 42 during use. The second bearing 38 is positioned within the bearing seat 50 closest to the impeller 42. Because the second bearing 38 is only soft mounted within the bearing seat 50 by way of the o-ring, it is able to absorb any radial forces generated by the impeller 42 as it spins during use. If an adhesive bond had been used to fix bearing 38 to bearing seat 50, then it is possible that radial forces could have weakened the adhesive bond over time, reducing the life of the motor, and potentially resulting in a catastrophic failure of the electric machine 10. However, the soft mounting cannot withstand any axial forces generated along the rotor assembly by the impeller during use, which is why an adhesive bond is used to fix the other bearing 40 to the bearing seat 52, and the use of two different mounting methods for each of the bearings is so beneficial.

Whilst particular embodiments have thus far been described, it will be understood that various modifications may be made without departing from the scope of the invention as defined by the claims. For example, the annular channel provided in the outer surface of each of the bearings may be provided on the inner surface of the bearing seat of the support body instead. In addition, the embodiments shown and described herein are directed to a compressor with an impeller. However, the invention would be beneficial to other types of electric machine such as brushless electric motors used to drive loads other than impellers.

The invention claimed is:

1. An electric machine comprising:
   a stator assembly;
   a rotor assembly; and
   a support body;
   the rotor assembly comprising a shaft to which is mounted a first bearing and a second bearing and a permanent magnet mounted on the shaft between the first bearing and second bearing, wherein the shaft is configured to drive a load mounted to an end of the shaft and the second bearing is closer to the end of the shaft than the first bearing, and the support body comprising first and second bearing seats to which the bearings of the rotor assembly are mounted,
   wherein the first bearing is mounted to the first bearing seat by adhesive, the second bearing is soft-mounted to the second bearing seat by an o-ring, wherein the first bearing comprises an annular groove on an outer surface of the first bearing, wherein the second bearing comprises an annular groove on an outer surface of the second bearing, and wherein the o-ring is placed circumferentially around the second bearing such that the o-ring sits within the annular groove of the second bearing.

2. The electric machine of claim 1, wherein the electric machine is a compressor and the load is an impeller.

3. The electric machine of claim 2, wherein the impeller is a mixed flow impeller.

4. The electric machine of claim 1, wherein the support body comprises an elongate central part having an inside and an outside, and the first and second bearing seats are positioned axially at opposite ends of the elongate central part, such that the permanent magnet is positioned within the inside of the elongate central part of the support body.

5. The electric machine of claim 4, wherein the stator assembly is supported by the outside of the elongate central part of the support body.

6. An electric machine comprising:
   a stator assembly;
   a rotor assembly; and
   a support body comprising an elongate central part, wherein at least a part of the stator assembly is radially external to the elongate central part of the support body;
   the rotor assembly comprising a shaft to which is mounted a first bearing and a second bearing and a permanent magnet mounted on the shaft between the first bearing and second bearing, and the support body comprising first and second bearing seats to which the bearings of the rotor assembly are mounted,
   wherein the first bearing is mounted to the first bearing seat by adhesive, the second bearing is soft-mounted to the second bearing seat by an o-ring, wherein the first bearing comprises an annular groove on an outer surface of the first bearing, wherein the second bearing comprises an annular groove on an outer surface of the second bearing, and wherein the o-ring is placed circumferentially around the second bearing such that the o-ring sits within the annular groove of the second bearing.

7. The electric machine of claim 6, wherein the shaft is driving a load mounted to one end of the shaft, and the second bearing is closer to the load than the first bearing.

8. The electric machine of claim 7, wherein the electric machine is a compressor and the load is an impeller.

9. The electric machine of claim 8, wherein the impeller is a mixed flow impeller.

10. The electric machine of claim 6, wherein the elongate central part of the support body has an inside and an outside, and the first and second bearing seats are positioned axially at opposite ends of the elongate central part, such that the permanent magnet is positioned within the inside of the elongate central part of the support body.

11. The electric machine of claim 10, wherein the stator assembly is supported by the outside of the elongate central part of the support body.

\* \* \* \* \*